J. P. METZGER.
COMBINED REGULATING AND GOVERNING APPARATUS.
APPLICATION FILED JAN. 14, 1920.

1,369,691.

Patented Feb. 22, 1921.
3 SHEETS—SHEET 1.

WITNESSES

INVENTOR
Jules P. Metzger
BY
ATTORNEYS

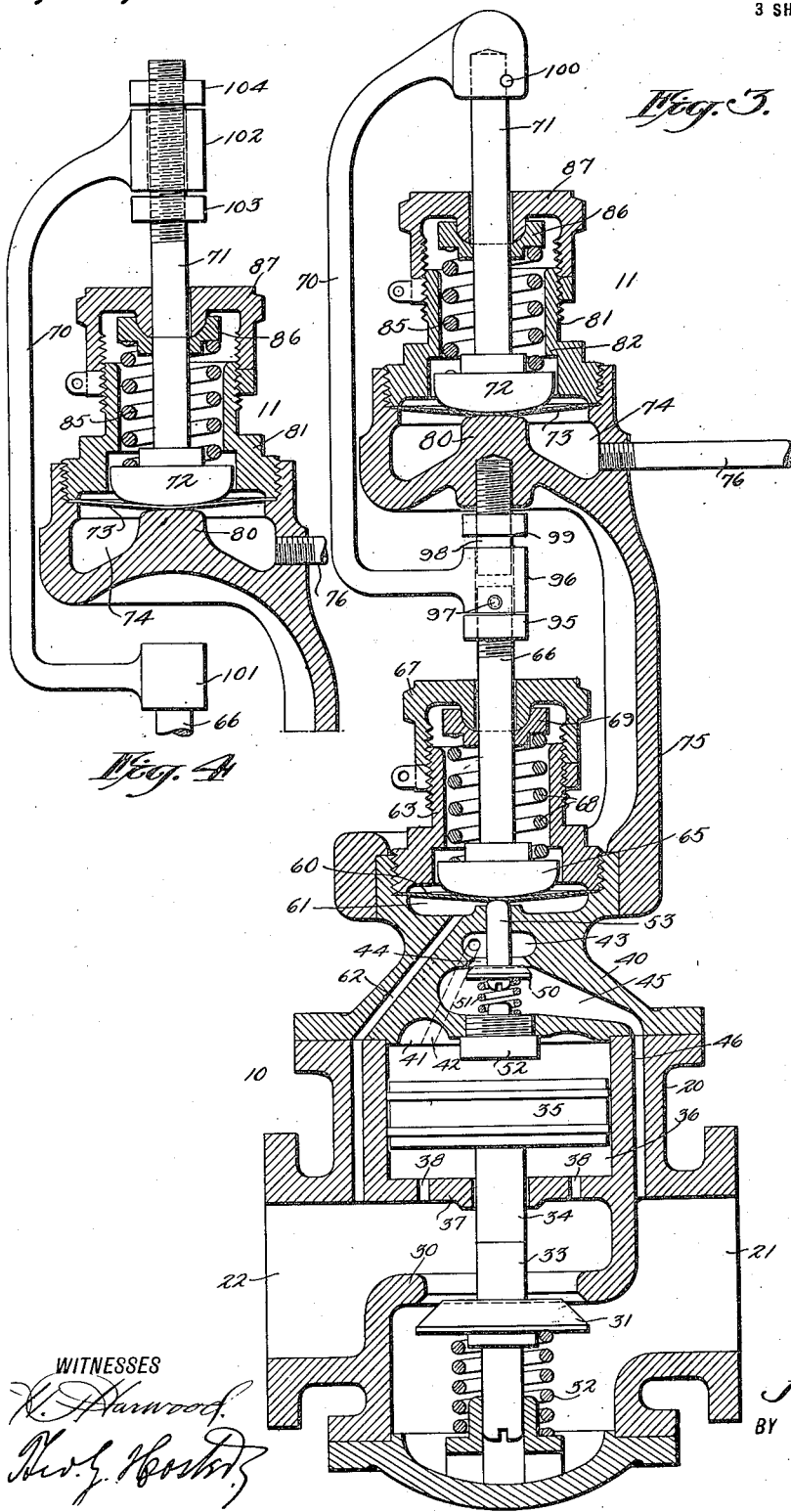

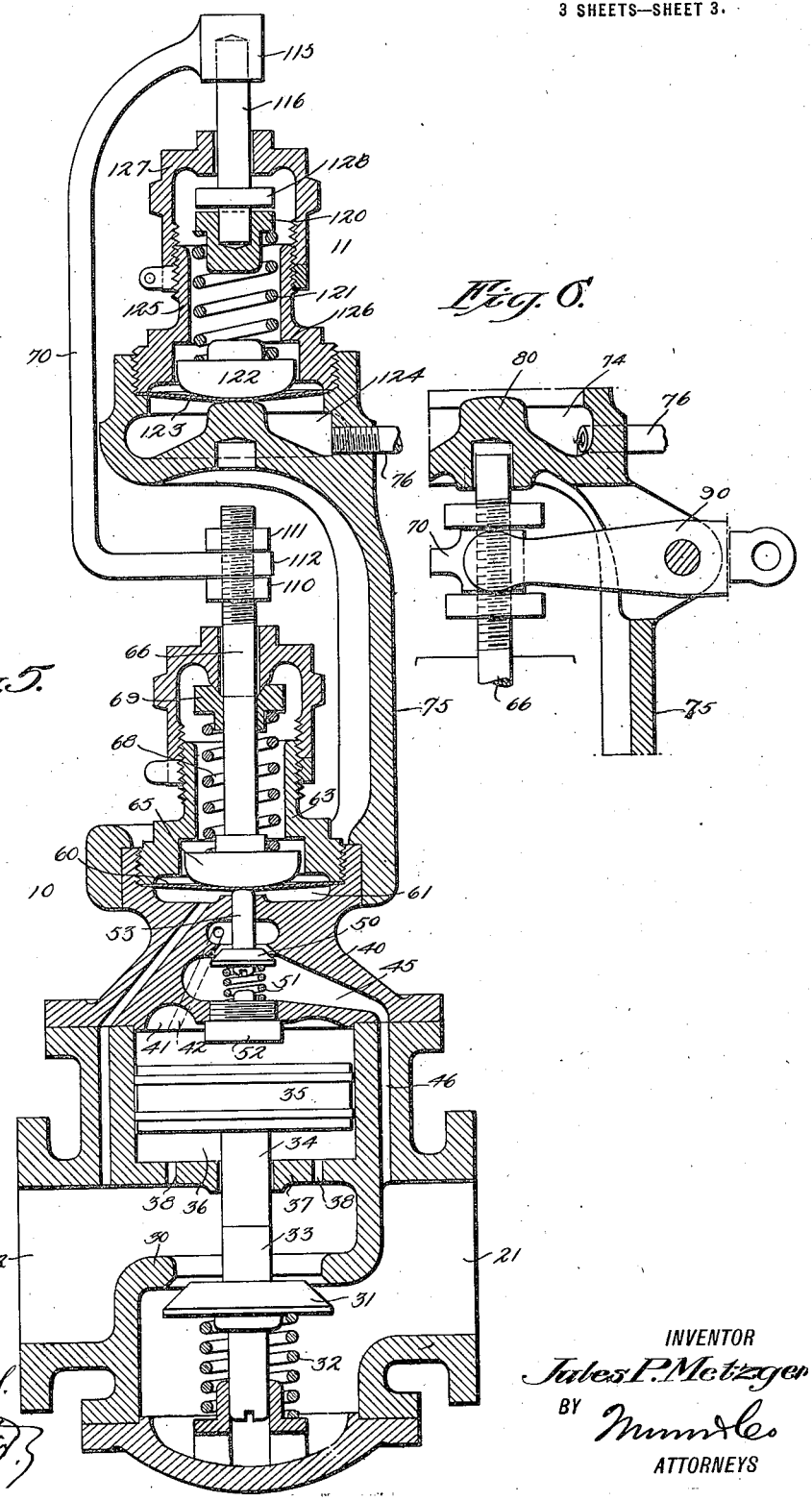

UNITED STATES PATENT OFFICE.

JULES P. METZGER, OF CARLSTADT, NEW JERSEY, ASSIGNOR TO THE LESLIE CO., OF LYNDHURST, NEW JERSEY, A CORPORATION OF NEW JERSEY.

COMBINED REGULATING AND GOVERNING APPARATUS.

1,369,691.     Specification of Letters Patent.      Patented Feb. 22, 1921.

Application filed January 14, 1920. Serial No. 351,353.

*To all whom it may concern:*

Be it known that I, JULES P. METZGER, a citizen of the United States, and a resident of Carlstadt, in the county of Bergen and State of New Jersey, have invented a new and Improved Combined Regulating and Governing Apparatus, of which the following is a full, clear, and exact description.

The invention relates to pressure regulators such as shown and described in the Letters Patent of the United States No. 1,244,226 and No. 1,308,638, granted to me on October 23, 1917, and July 1, 1919, respectively, and in the application for Letters Patent of the United States, Serial No. 351,352 filed by me under even date herewith.

The object of the present invention is to provide a new and improved combined pressure regulating and governing apparatus, of which the regulator is adapted to be set to a predetermined pressure for correspondingly controlling the motive agent of an engine pump, air compressor or other similar machine, and of which the governing device is adapted to control the said regulator and is itself controlled by the fluid pressure resulting from the activity of the engine pump, air compressor or other machine. Another object is to render the pressure regulating and governing apparatus exceedingly sensitive and dispensing entirely with packings, glands, stuffing boxes and other devices producing frictional resistance. Another object is to permit of adjusting the governing device wholly independently of the regulating device.

Another object is to permit the regulating device to function wholly independently of the governing device in case of repairs or the like.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Fig. 3 is an enlarged sectional side elevation of the improved regulating and governing apparatus;

Fig. 4 is a similar view of a modified form of the connection connecting the regulating device with the governing device;

Fig. 5 is a similar view of a modified form of the combined pressure regulating and governing apparatus; and Fig. 6 is a similar view of an emergency lever connection with the pressure regulating device.

Figure 1:
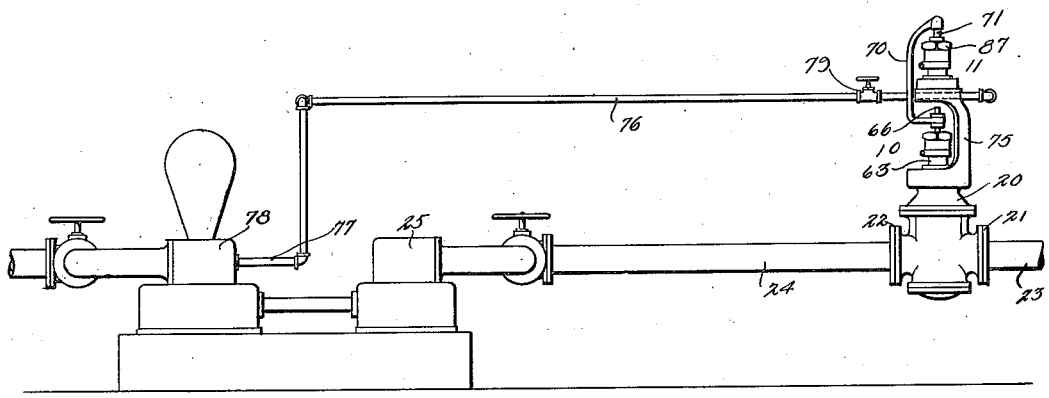
Figure 1 is a side elevation of the improved regulating and governing apparatus as applied to a steam pump.
Figure 2:
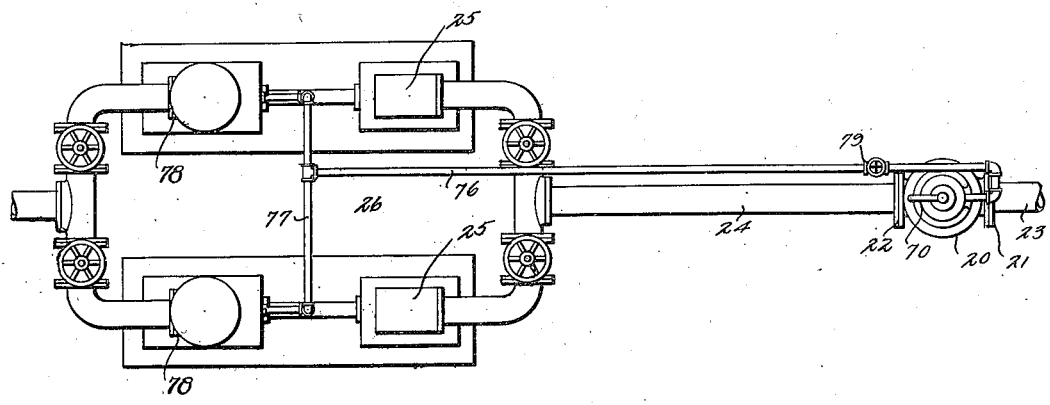
Fig. 2 is a plan view of the same.

The improved combined pressure regulating and governing apparatus comprises essentially a fluid pressure regulator 10 and a fluid pressure governing device 11 for the said pressure regulator 10. The pressure regulator 10 is practically of the construction of the pressure regulator shown and described in the Letters Patent of the United States, No. 1,308,638, above referred to. The body 20 of the regulator 10 is provided at one side with an inlet 21 and at the other side with an outlet 22, and the said inlet 21 is connected by a pipe 23 with a boiler or other source of motive agent supply. The outlet 22, as shown in Figs. 1 and 2, is connected by a pipe 24 with steam chests 25 of a duplex steam pump 26 of any approved construction, but it is expressly understood that I do not limit myself to this particular application of the combined regulating and governing apparatus. A valve seat 30 within the body 20 connects the inlet 21 with the outlet 22, and this valve seat 30 is controlled by a valve 31 normally held to its seat by a light spring 32. The upper end of the stem 33 of the valve 31 is connected with the stem 34 of a piston 35 mounted to reciprocate in a cylinder 36 formed within the body 20 and separated from the outlet by a horizontal partition 37 having openings or ports 38 to connect the lower end of the cylinder 36 with the outlet 22. The upper end of the cylinder 36 is closed by a cap 40 provided at the under side with a recess 41 connected by one or more ports 42 with a chamber 43 arranged in the cap 40. The chamber 43 is provided at the under side with a valve seat 44 opening into an expansion chamber 45 formed in the cap 40 and connected by a port 46 with the inlet 21 of the valve body 20. The valve seat 44 is normally closed by a controlling valve 50 extending within the expansion chamber 45 and pressed to its seat by a spring 51 seated on the top of a screw plug 52 screwing in the bottom of the expansion chamber 45. The upwardly extending stem 53 of the controlling valve 50 is connected at its upper end by a diaphragm 60 held in a diaphragm chamber 61 arranged in the top of the cap 40 and connected by a port or opening 62 with the outlet 22 of the body 20. The diaphragm 60 is fastened in place by a nipple 63 screwed or otherwise secured to the top of the cap 40. The top of the diaphragm 60 is normally pressed on by the lower enlarged end or head 65 of a stem or rod 66 extending centrally in the nipple 63 and passing through a cap 67 screwed or otherwise secured to the nipple 63. On the head 65 of the rod or stem 66 rests the lower end of a spring 68 extending within the nipple 63 and engaging with its upper end a seat 69 swiveled on the under side of the cap 67. By screwing the cap 67 down or up on the nipple 63 the tension of the spring 68 can be regulated and after the desired adjustment is made the cap 67 can be locked and sealed by a suitable locking and sealing device, if it is desired to do so. It is understood that by the arrangement described, a special spring device is provided whereby the diaphragm 60 is alive, lively, and resilient at all times.

The rod or stem 66 projects a distance above the top of the cap 67 and the upper end of the rod or stem 66 is connected by a yoke or coupling member 70 with the upper end of a rod or stem 71 forming part of the governing device 11. The lower end of the stem 71 is provided with a head 72 on a diaphragm 73 extending over the top of a fluid chamber 74 arranged on the upper end of a bracket 75 attached to the top of the cap 40, as plainly indicated in the drawings. The fluid chamber 74 is connected by a pipe 76 and branch pipes 77 with the water compartment 78 of the pump 26 so that water under pressure of the pump 26 fills the chamber 74 and exerts a pressure against the under side of the diaphragm 73. The pipe 76 is provided with a valve 79 for closing the pipe whenever it is desired to do so, but the valve 79 is normally open. Within the chamber 74 is arranged a central stop 80 for the middle portion of the diaphragm 73 to rest on when moved into lowermost position. The diaphragm 73 is held in place by a cap 81 screwed or otherwise secured to the top of the chamber 74, and within this cap 81 is formed a top flange 82 adapted to be engaged by the top of the head 72 of the rod or stem 71 to limit the upward movement of the said rod 71 and that of the diaphragm 73. On the top of the head 72 rests the lower end of a spring 85 abutting with its upper end against a seat 86 swiveled on the under side of a cap 87 screwed or otherwise secured on the cap 81. By the arrangement described an adjustable spring device is provided for the top of the diaphragm 73. It is understood that when the fluid pressure in the chamber 74 falls below a normal predetermined pressure then the rod or stem 71 and with it the diaphragm 73 is moved downward by the action of the spring 85, and this downward movement of the stem or rod 71 is transmitted by the yoke 70 to the stem 66 of the regulator 10 whereby the diaphragm 60 is moved downward and with it the valve 50 to cause a further downward movement of the piston 35 with a view to more fully open the valve 31 with a view to admit more steam to the steam chests 25 until the water again reaches the predetermined pressure. When this takes place the diaphragm 73 is lifted to connect the rods or stems 71 and 66 to return the valves 50 and 31 to normal position. In case of an excess pressure in the chamber 74 the diaphragm 73 is moved upward and consequently the rods or stems 71 and 66 are lifted to reduce the pressure on the top of the diaphragm 60 and hence to allow the valve 50 to move toward its seat 44 to permit the valve 31 to move toward its seat 30 and thus reduce the pressure supply to the steam chests 25 until the pressure in the chamber 74 reaches the predetermined pressure to which the governing device 11 is set.

The connection of the yoke 70 with the stems 66 and 71 may be rigid, as shown in Fig. 3, or providing a leeway, as shown in Fig. 4, or being adjustable, as shown in Fig. 5. If desired, an emergency lever 90 may be connected with the rod or stem 66, as shown in Fig. 6. As shown in Fig. 3, the upper end of the rod or stem 66 is threaded and on it screws a nut 95 engaging the under side of a bearing 96 formed on the lower end of the yoke 70, and a pin 97 extends through the bearing 96 and the top portion of the rod 66 to rigidly connect the yoke 70 with the stem or rod 66. The top of the bearing 96 engages a guide pin 98 screwing with its upper end into the bottom of the chamber 74, and this guide pin 98 is provided with a collar 99 to limit the upward movement of the yoke 70 and consequently that of the stem or rod 66. The upper end of the yoke 70 is rigidly secured to the rod or stem 71 by a pin 100.

In the modified form shown in Fig. 4, the yoke 7 is rigidly connected at its lower end 101 with the upper end of the stem 66, and the top of the yoke is provided with a bearing 102 slidingly engaging the upper end of the rod or stem 75 of the governing device 11. Nuts 103 and 104 screw on the upper threaded end of the rod or stem 71 which confine the bearing 102 between the said nuts and thus provide an adjustable connection between the yoke 70 and the rod or stem 71.

In the modified form shown in Fig. 5, the upper end of the rod or stem 66 is threaded and provided with nuts 110 and 111, between which is confined the lower end 112 of the yoke 70, thus providing an adjustable connection between the yoke 70 and the rod or stem 66. The upper end of the yoke 70 is provided with a head 115 fitting loosely on the upper end of a stem or rod 116 forming part of the governing device 11. This governing device is arranged as follows: The lower end of the rod or stem 116 engages a seat 120 against which abuts the upper end of a spring 121 seated at its lower end on a head 122 resting on top of a diaphragm 123 arranged in the top of a fluid chamber 124 supported by a bracket 75 from the cap 40 of the pressure regulator 10, which is the same as above described relative to the pressure regulator shown in Fig. 3. The spring 121 extends within a cap 125 having a shoulder 126 to limit the upward movement of the head 122. On the cap 125 is screwed or otherwise secured a cap 127 through which extends the stem or rod 116. On the stem 116 within the cap 127 is a shoulder 128 adapted to limit the upward movement of the rod or stem 116 by abutting against the under side of the cap 127.

From the foregoing it will be seen that the arrangement allows setting the predetermined pressure direct to an engine or receiver, and, having done this, to also indirectly set the regulator to supply, for instance, an engine at the predetermined pressure necessary for operating an air compressor or other device, with variable load upon it intermittently. The compressed air of the air compressor sub-controls through its own delivery of outlet pressure under diaphragm 73, and through its action, the supply of steam in accordance to its variable delivery, and hence acts, in this instance, as a governing device.

It will be noticed that a compact pressure regulating and controlling or governing device is provided which is applicable where other devices of the kind could not possibly produce the functions my improvement is capable of. Furthermore, an apparatus simple of construction is provided and one which embodies the features of a pressure regulator only, if wanted, a pump governor, or other subjective controlling device, and, if desired or necessary, an emergency stop valve, all in one, the device having means of independently setting and adjusting the predetermined pressure, either on the regulator to supply the fluid (steam or water) at pressure desired directly, and also, after the regulator is thus set, means of adjusting or modifying said predetermined pressure at which the apparatus has supplied the fluid delivered, for instance, to a receiver (or pump delivery pressure, if the apparatus is used as a pump governor) indirectly from that source, so that no matter what differential conditions of delivery pressure might occur, directly or indirectly, the adjustment of pressure on the regulator, the means of adjustment provide a counter-effect in the regulation capable through means employed and modified, so as to obtain a most satisfactory controlling regulator pressure and pump governing device, as it is possible to make, capable of being used in various applications while ever ready at the same time in an emergency situation, should anything in the way of a mishap occur to the engine, pump or apparatus, which the device is actuating, the means employed will be capable to shut off the device at the will of the operator, and may be provided to do so, even from a distant point.

The apparatus also permits the operator to increase the set limit of the apparatus and vary, for the time, its supply of steam, without interfering with its adjustment, that might have been locked or sealed when said apparatus has been thus provided, so as not to be tampered with.

It is understood that two superposed fluid chambers 45 and 74 are provided, closed by a diaphragm 60 or 73, and each having an adjustable and pressure setting device on same, the lower diaphragm 60 being actuated by fluid pressure on the under side; one of the fluid chamber diaphragms (as shown, the lower one 60) being part of a self-contained pressure regulator, the other fluid chamber 74 being part also of the apparatus, but recipient of fluid pressure from another source, to be regulated and controlled, the two fluid chambers 61 and 74 and the controlling device, and their several members, coördinating to regulate properly the main controlling valve 31 of the apparatus 10, thereby producing with all its assembled parts, a very substantial and compact apparatus, capable to be used in the most particular service, and most exacting results, wherever fluid pressure has to be regulated.

It will be noted that two independent means of adjustment are provided in the apparatus, and that any variation desired to fulfil particular conditions that are sometimes necessary in the power plants, aboard ships, etc., to better or, sometimes, to meet the various conditions of emergency, this apparatus can always be depended upon to fulfil all requirements, and adjustment of same.

In practice, by screwing down the adjusting cap 67 of the regulator 10 proper or the adjusting cap 87 of the governing device 10, the corresponding spring 68 or 85 is compressed, and thereby the corresponding head 65 or 72 of the rods 66 or 71 transmits its effect by contact to each diaphragm respectively. It will be noticed that the connected rods 66 and 71 are shown also with means of lengthening and shortening, also that in this respect and particularly Fig. 4 provides a special construction. In Fig. 3, the apparatus is shown in operation, with the proper lengths or rods 66 and 71 having been adjusted. In Fig. 6, the emergency means are shown centrally located and in no way affecting the apparatus except when it is purposely used. In Fig. 3, the apparatus shows with the proper lengths of rods obtained through the screwing of jam nut 95; in Fig. 4, a rigid secured construction of the two rods is shown, and means of adjustment are provided at the upper end of same.

In the practice of operation, the pressure regulator is set at a predetermined pressure first, the upper adjusting device is then set to whatever pressure is desired, by admitting fluid pressure from receiver, pump, or other source to be regulated. If now the rods are adjusted with the "leeway," "play" or "lag" taken up, it is evident that the smallest amount of movement that takes place in the diaphragm 73 will effect a corresponding movement of diaphragm 60 and vice versa; therefore, when pressure leading to fluid chamber 61 tends to exceed the pressure that the fluid chamber adjusting device is set at, the supply of steam from regulator which operates directly or indirectly, through operated pump, etc., the supply of fluid chamber 74 will be decreased, through the restriction of passage of fluid to the regulator, by the action of controlling valve 50, and vice versa, as it is evident that the two diaphragms 60 and 73, which form part of the adjusting device, tend to keep equilibrium, and all the members connecting with same, thereby producing a most sensitive device.

In some cases, however, it is very important that although the most sensitive device is required, it becomes an advantage if a small amount of leeway, lag or play be allowed, for instance, where the device supplies several apparatus some of the time, working intermittently, discharging, for instance, into a receiver, or where various pumps are functioned in the same manner. In these cases, as stated above, the device must be absolutely sensitive and automatic, but an allowance can be made by the means shown, viz: connected rods 66 and 71, and by which while the adjusting device has been set at a proper predetermined pressure it will not affect the rod 66, and therefore not affect the pressure regulator controlling the steam supply until the lag or leeway allowed has been reached, or taken up, when then the rod 66 and therefore the regulator will act and function as before. This will apply also in the same way in regard to the upper rod 71; it is therefore evident that the regulating device can be adjusted so as to instantly respond to any predetermined set pressure variation that any conditions require, or again to not respond to some other conditions, until a certain time elapses, and this in no case, without requiring to change the predetermined set pressure and unlocking of the regulator, or having affected the automaticity of the pressure regulator proper. As shown by drawing, it will be seen that in my improvement, the springs 68 and 85 of the adjusting devices are held in a condition of compression at all times when in operation, although the provision of independent allowance for lag or leeway are made, and therefore the device is instantly ready to respond to any variation of pressure, as the diaphragm must render it frictionless and resilient at all times, all parts coördinating to produce the functions required from them, as it will be noted that both springs act in accord and increase the effect in either direction, up or down, and the functions of the apparatus are therefore obtained without possibility of failure. The apparatus is complete and all its members are working, acting in line free to move in a vertical or axial line, therefore smoothly up and down, free from all friction, as no stuffing box or packing of any kind is used in the whole apparatus, making it free from all disturbing forces, or actions occurring in other apparatus of the kind. In my improvement, all forces and their action on the parts of the apparatus coördinate with the members of the apparatus, to produce the results sought. This is one of its most important features, as it is well known that no matter how good a stem is packed against a fluid under pressure, wherever a stuffing box is used, friction occurs, and the conditions of or the amount of friction is never alike, due to many reasons of adjustment, etc., and also conditions of heat, pressure, they producing a different grip around the members so packed, this defect increasing with high pressure, and also according to the fluid used, and a device that is intended to be automatic, cannot be if packing is used, and particularly so where sensitiveness of the device is required, its functions will be erratic and will vary in accordance with the various gripping conditions incidental to the packing or stuffing box. No matter what care is taken by the operator, no automatic and sensitive device can be made reliable with any packing joint, "sticking" will occur, or again if not tightly packed, leakage around the stem will take place, and the function of the apparatus is destroyed, and it is liable to destroy the very engine, etc. It serves and becomes not only a risk to property but even safety is put in jeopardy.

The improvement as above described, contains such a number of novel features, and capable of functional modification, that it enables the apparatus to be used not only as an automatic pump governor, where merely a constant pressure is desired, but it is particularly adapted for any kind of pump controlling or steam and fluid controlling device, as required in power plants and wherever air or steam is used, for instance, it can be installed as an excess boiler feed pump governor, the excess pressure on feed pump maintained through the functional provision of adjustment and setting of the upper diaphragm against the pressure desired to be maintained, also the same functional provision of the lower regulating adjusting device, coördinating with same, and by which the steam pressure of the pump is also kept in regulation to produce a constant pressure, irrespective of variation of boiler or initial pressure, providing it is above the predetermined pressure of the regulator.

It is well known to those skilled in the art and operating engineers in stationary as well as in marine service that many pump regulators differ in name according to the purposes they are intended for, as they vary in some way or mode of construction, however, they are not reliable in obtaining the results notwithstanding, due to the fact that the part they depend on is a stuffing box for guide of their stem. The applicant believes that it is an important improvement he has evolved, viz: a controlling governing apparatus that fulfils most of the conditions of other different devices as referred to, as well as to other ones more complex, these fail to provide the conditions of adjustment to produce the results that are demanded in practice but that are fully attained with my improvement.

Having thus described my invention, I claim as new and desire to secure by Letters Patent:—

1. A combined fluid pressure regulating and governing apparatus, comprising a fluid pressure regulator and a fluid pressure governing device for the same, the said regulator and the said governing device having their axes coinciding, and a mechanical connection between the said regulator and the said governing device to control the regulator by the governing device.

2. A combined fluid pressure regulating and governing apparatus, comprising a fluid pressure regulator having a diaphragm, and a spring device for the same, a fluid pressure governing device for the said regulator and having its axis coinciding with the axis of the said regulator, the said governing device having a spring device, and means connecting the said spring devices with each other.

3. A combined fluid pressure regulating and governing apparatus, comprising a fluid pressure regulator having a diaphragm and an adjustable spring device for the said diaphragm, the spring device having a stem, a fluid pressure governing device for the said regulator and located above the same, the said governing device having a diaphragm and an adjustable spring device for the diaphragm, the said spring device of the governing device having a stem, and a direct connection between the said stems.

4. A combined fluid pressure regulating and governing apparatus, comprising a fluid pressure regulator having a diaphragm and an adjustable spring device for the said diaphragm, the spring device having a stem, a fluid pressure governing device for the said regulator and located above the same, the said governing device having a diaphragm and an adjustable spring device for the diaphragm, the said spring device of the governing device having a stem, the said diaphragms and stems of the regulator and the governing device having their axes coinciding, and a connection between the said stems.

5. A combined fluid pressure regulating and governing apparatus, comprising a fluid pressure regulator having a diaphragm subjected to pressure on one side and a spring device engaging the other side of the diaphragm, a governing device having a diaphragm subjected to pressure on one side and a spring device engaging the other side of the diaphragm of the governing device, the said spring devices having stems, the axes of which coincide, and a direct connection between the said stems.

6. In a fluid pressure regulating and governing device, a pressure regulator controlling fluid under pressure, a governing device located above said regulator and having a fluid chamber receiving fluid pressure from another source, and means of sub-controlling through said fluid pressure the supply of said regulator proper.

7. A fluid pressure regulating and governing device consisting of a pressure regulator provided with an adjusting pressure device, a fluid pressure controlling chamber located above the said regulator and receiving fluid under pressure from another source, the said chamber being provided with an adjusting pressure device, and means connecting the said adjusting pressure devices with each other.

8. A fluid pressure regulating and governing device consisting of a regulator with controlling device, located above said regulator, a fluid chamber closed by a diaphragm, fluid pressure acting under said diaphragm, a spring adjusting device located above said diaphragm, connecting adjustable means secured to said adjusting device, and pressure regulator controlling device.

9. A fluid pressure regulating and governing device, comprising a pressure regulator controlled by a diaphragm subjected on its under face by fluid under pressure, and on its upper face by a spring adjusting device, a fluid chamber located above said adjusting device and containing a diaphragm subjected under its lower face to fluid pressure, and its upper face having an independent spring adjusting device, both adjusting devices coordinating through lifting connecting members.

10. A fluid pressure regulating and governing device consisting of a fluid pressure regulator controlled by a diaphragm, an adjusting pressure device on same, a fluid pressure and diaphragm chamber located above said diaphragm, both adjusting devices coordinating through lifting and depressing connecting members, and adjustable means on said connecting members.

11. A fluid pressure regulating and governing device consisting of a pressure regulator controlling fluid under pressure by a diaphragm, a fluid pressure chamber containing a diaphragm above said regulator, these members being superposed and axially true in line, an independent adjusting and controlling spring regulating device contacting each diaphragm, and coördinating connecting means securing the lower and upper adjusting spring devices, so as to act as a single regulating and governing fluid pressure regulator.

12. In a fluid pressure regulating and governing device, two separate fluid chambers each containing a diaphragm, said diaphragms located one above the other, fluid pressure acting under said diaphragms, counteracting independent adjustable means located above and contacting said diaphragms, with their lifting rods adjustably connected, fluid pressure acting in the same direction under both diaphragms, and adjusting spring devices counteracting in the same direction, against top of diaphragms.

13. A fluid pressure regulating and governing device controlling fluid under pressure, a fluid pressure chamber located above said regulator and receiving fluid pressure from another source, an adjusting spring device on said regulator and said fluid pressure chambers, both coördinating through an adjustable lifting and depressing member secured to the spring devices, and a fulcrumed emergency lever free to engage said lifting and depressing member, to modify, or even nullify, the action of said pressure regulator.

14. A fluid pressure regulating and governing device comprising a pressure regulator having a fluid chamber closed by a diaphragm, another fluid chamber placed above, also closed by a diaphragm, a casing on each diaphragm, with a resilient adjustable member, an adjusting cap closing said casings, a rod contacting at its bottom the diaphragms, and supporting the resilient member, both rods being connected to a lifting and depressing member, separate means of adjustment on said lifting member, and fluid pressure acting on under side of diaphragm.

15. A fluid pressure regulating and governing device, consisting of a pressure regulator containing a diaphragm, a fluid pressure chamber located above said regulator and closed by a diaphragm, each diaphragm having resilient and adjustable independent setting pressure spring devices on same, rigid but adjustable means of connection between same, the fluid pressure acting separately on under side of each diaphragm, and the spring adjusting devices counteracting independently on top of said diaphragms.

16. A fluid pressure regulating and governing device comprising a regulator having a casing with inlet and outlet separated by a partition, a main valve in said casing governing above an opening in said partition, a cylinder, a piston working in said cylinder, a top cap closing said cylinder, means of admission to the cylinder through a controlling valve, a diaphragm on top of said controlling valve and forming the fluid chamber under said diaphragm, port means of leading fluid pressure to controlling valve, port means to lead outlet pressure to fluid chamber, another fluid chamber securely located above in axial line with regulator and closed by a diaphragm, port means to lead pressure from a source of supply under said diaphragm, independent resilient spring adjusting means located in a casing on top of each of said diaphragms, and rigid but adjustable means to connect said resilient member, adjusting means to coöperate and coördinate as a single adjusting and regulating device, to control the regulator.

17. A fluid pressure regulating and governing device, comprising a regulator having a casing with inlet and outlet separated by a partition, a main valve in said casing governing above an opening in said partition, a cylinder, a piston working in said cylinder, a top cap closing said cylinder, means of admission to the cylinder through a controlling valve, a diaphragm on top of said controlling valve and forming the fluid chamber under said diaphragm, port means of leading fluid pressure to controlling valve, port means to lead outlet pressure to fluid chamber, another fluid chamber located above in axial line with regulator, and closed by a diaphragm, port means to lead pressure from a source of supply under said diaphragm, independent resilient spring adjustment means located in a casing on top of each of said diaphragms, and rigid but adjustable means to connect said resilient member, adjusting means to coöperate and coördinate as a single adjusting and regulating device to control the regulator, and an emergency lever engaging said lifting and adjustable means connection, to modify the governing means of said regulator or shut off said regulator entirely.

JULES P. METZGER.